J. S. REYNOLDS.
CUTTING TORCH TIP.
APPLICATION FILED DEC. 2, 1918.

1,313,605.

Patented Aug. 19, 1919.

INVENTOR
JOY S. REYNOLDS
BY
Frank Warren
ATTORNEY

UNITED STATES PATENT OFFICE.

JOY S. REYNOLDS, OF SEATTLE, WASHINGTON.

CUTTING-TORCH TIP.

1,313,605.      Specification of Letters Patent.      Patented Aug. 19, 1919.

Application filed December 2, 1918. Serial No. 265,184.

*To all whom it may concern:*

Be it known that I, JOY S. REYNOLDS, a citizen of the United States, residing at Seattle, in the county of King and State of Washington, have invented a certain new and useful Improvement in Cutting-Torch Tips, of which the following is a specification.

My invention relates to improvements in tips for cutting torches of the form that employ oxygen and inflammable gas, as acetylene, for the purpose of cutting metals and the object of my invention is to provide a torch tip that is exceeding efficient in its operation and that will cut through a relatively great thickness of metal in proportion to the size of the torch and the amount of gas and oxygen that it consumes.

A further object of my invention is to provide a torch having a concave or recessed tip end that protects the small perforations through which the gas issues and prevent them from becoming clogged.

A still further object of my invention is to provide a novel arrangement for the exit of the oxygen and mixed gases so that the mixed gases will be prevented from flaring when the oxygen under high pressure is turned on and so that the mixed gases will not be sucked out of the torch tip at too high a velocity.

My invention consists in the novel construction of a torch tip as will be more clearly hereinafter described and claimed.

I accomplish these objects by devices illustrated in the accompanying drawings, wherein—

Figure 1:
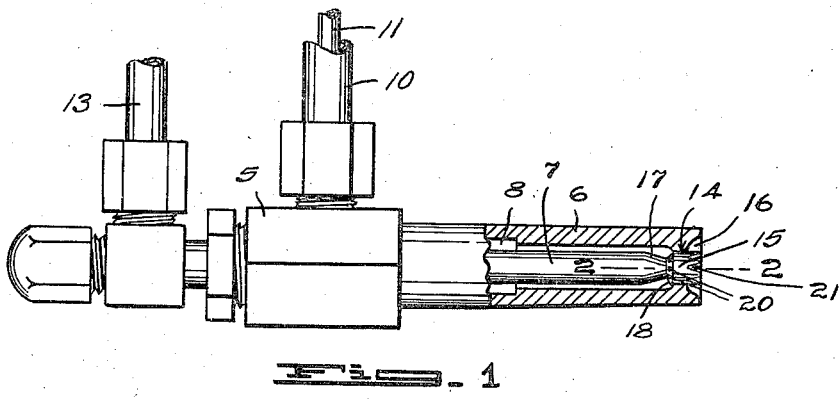
Figure 1 is a view partly in cross-section and partly in elevation of a torch head having a tip constructed in accordance with my invention.

Referring to the drawings, throughout which like reference numerals indicate like parts, the numeral 5 designates a torch head comprising an exterior tubular casing 6 and a stem 7 that is adapted to project within the casing and is of smaller diameter than the interior chambers of the casing to leave a passageway 8 for gas around the walls thereof.

The passageway 8 communicates in a suitable manner, not shown, with pipes 10 and 11 through which a mixture of inflammable gas and oxygen may be introduced under a relatively low pressure.

The stem 7 is provided with an axial passageway 12 that communicates, in a manner not shown, with a pipe 13 through which oxygen under a relatively high pressure may be introduced.

All of the above parts may be of any old and well known form of construction.

This invention resides in the novel construction of the tip end of the stem 7 and the tip of the casing 6.

At a point 14 near the tip of the casing 6 the diameter of the passageway 8 is reduced so that the head 15 on the end of the stem 7 will fit snugly therein and form a joint that will not permit the passage of any appreciable amount of gas.

The outer end of the casing 6 is recessed or dished as indicated at 16 and the head 15 is adapted to project outwardly within the concave or dished portion in concentric relation thereto, the stem 7 being movable lengthwise within the casing 6 so that the position of the head 15 within the tip end of the casing may be adjusted.

The stem 7 is tapered or converges at a point near the head 15 as indicated by the numeral 17 and then expands at a somewhat abrupt angle to form a shoulder 18 in the face of which a plurality of small perforations 20 originate.

The perforations 20, six of which are herein shown, are preferably equidistantly spaced and converge toward the axis of the stem 7 so that the joint at which they intersect the plane of the outer end of the head 15 is relatively near the perimeter of the passageway 12.

The end of the head 15 is provided with a plurality of triangularly shaped notches 21, that extend inwardly at the end of the head 15 to a point near the perimeter of the passageway 12 and gradually become shallower and terminate at a point about half way between the two ends of the head 15.

Figure 2:
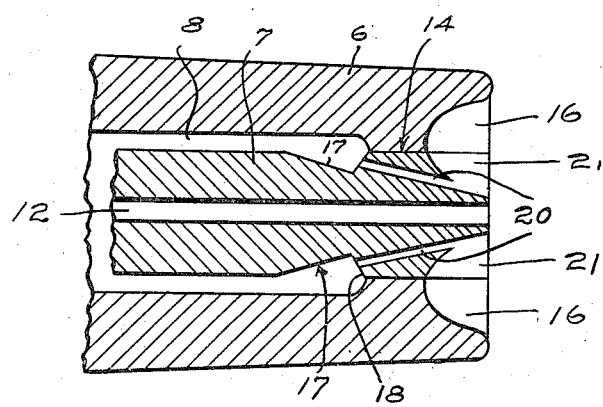
Fig. 2 is an enlarged view in cross-section of the torch tip substantially on broken line 2, 2 of Fig. 1.
Figure 3:
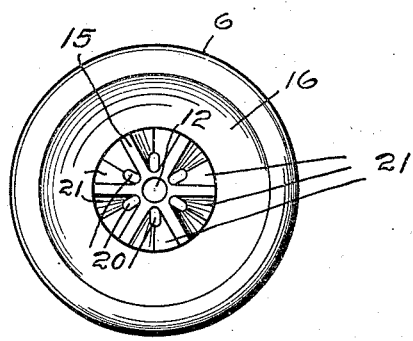
Fig. 3 is a view in end elevation of the tip on substantially the same scale shown in Fig. 2.

The number of notches 21 correspond to the number of the perforations 20 and the perforations intersect the bottoms of the notches before they reach the end of the head 15 as more clearly shown in Fig. 2.

When the device is in use gas, as a mixture of acetylene gas and oxygen, is admitted to the passageway 8 under a relatively low pressure and permitted to issue from the small perforations 20, at the same time pure oxygen under a relatively high pressure is admitted into the passageway 12 and permitted to issue therefrom as a high velocity to mingle with the inflammable gas and produce a cutting flame of great intensity.

It has been found in practice that when the notches 21 and recesses 16 are not used and the perforations 20 and passageway 12 terminate in the same plane there is a tendency to cause flaring of the inflammable gas when the oxygen under high pressure is turned on and it has further been found that the oxygen issuing from the passageway 12 at a high velocity and under a high pressure will tend to suck the inflammable gas from the torch too fast.

Both of these objections are overcome by providing the dish-shaped recess 16 in the end of the casing 6 and causing the perforations 20 to terminate in the notches 21 that are formed in the end of the head 15.

It has also been found by actual use that with a torch tip constructed as herein shown, a much more effective cutting flame can be obtained than can be obtained under the same conditions if the V shaped notches 21 in the head 15 and dish-shaped recess in the end of the casing 6 are dispensed with.

By causing the perforations 20 to terminate in the bottom of the V shaped notches 21 before they intersect the plane of the end of the torch tip the open ends of the perforations are protected and are less liable to become clogged and obstructed by dirt and foreign matter in such a manner as to cause back firing.

Obviously changes in the form of construction of my torch tip may be resorted to within the scope of the following claims.

What I claim is:

1. A cutting torch tip comprising a tubular casing having a section of reduced diameter adjacent its outer end and provided with a concave recess in its outer end, a stem of less diameter than the bore of said casing extending lengthwise therein, a head on said stem said head being adapted to fit snugly within said section of reduced diameter and to project outwardly into said concave recess in the end of said casing, said head and said stem having a concentric passageway therethrough and said head having peripheral notches in its outer end and being provided with perforations that communicate with the space within said casing and terminate in said notches.

2. A cutting torch tip comprising a tubular casing having a section of reduced diameter adjacent its outer end and having its outer end provided with a concave recess, a stem of less diameter than the bore of said casing extending lengthwise therein said stem having a section that contracts gradually and then expands somewhat abruptly to form a shoulder, an integral head on said stem said head being adapted to fit snugly within said section of reduced diameter in said casing and to project outwardly into said concave recess in the end of said casing, said stem and said head having an axial passageway and said head having V-shaped peripheral notches in the outer end thereof and being provided with gas passageways that originate in said shoulder and terminate in the rearmost bottom portion of said notches.

3. A cutting torch tip comprising an external casing having an axial tubular bore and provided near its outer end with a section wherein the bore is of reduced diameter, said casing having a dish-shaped recess provided on its outer end, a stem of less diameter than said bore adapted to project therein in concentric relation thereto whereby an annular passageway for gas is provided therebetween said stem having an axial passageway extending therethrough and being provided adjacent its end with a section that converges gradually and then expands abruptly to form a shoulder, an integral head on the outer end of said stem adapted to fit snugly within the reduced end section of said casing and to project outwardly into the dish-shaped recess in the end of said casing, said head having a plurality of V-shaped peripheral notches in its outer end portion and being provided with a plurality of perforations that extend from said shoulder and terminate in said notches.

In witness whereof I hereunto subscribe my name this 25th day of November, A. D. 1918.

JOY S. REYNOLDS.